United States Patent [19]

Weiss

[11] Patent Number: 5,585,066
[45] Date of Patent: Dec. 17, 1996

[54] MULTIPLE UTILIZATION OF WORKING AIR

[76] Inventor: Ronald Weiss, Jersbeker Strasse 29, 22941 Bargteheide, Germany

[21] Appl. No.: 344,494

[22] Filed: Nov. 23, 1994

[30] Foreign Application Priority Data

Nov. 26, 1993 [DE] Germany ............... 43 40 290.9

[51] Int. Cl.$^6$ .................................. B29C 49/12
[52] U.S. Cl. .................. 264/526; 264/532; 425/529
[58] Field of Search .................... 264/532, 526, 264/528; 425/522, 529

[56] References Cited

U.S. PATENT DOCUMENTS

| 2,345,082 | 3/1944 | Waseige . | |
|---|---|---|---|
| 3,275,728 | 9/1966 | Martino | 264/532 |
| 3,400,636 | 9/1968 | Schneider . | |
| 3,888,961 | 6/1975 | Schonewald | 264/528 |
| 4,488,863 | 12/1984 | Collette . | |
| 4,498,854 | 2/1985 | Ross | 425/522 |
| 4,790,741 | 12/1988 | Takausaki et al. | 425/529 |
| 5,141,682 | 8/1992 | Steinbichler | 264/40.3 |
| 5,244,610 | 9/1993 | Kitzmiller . | |

FOREIGN PATENT DOCUMENTS

| 3111925A1 | 10/1982 | Germany . |
|---|---|---|
| 5433566 | 8/1977 | Japan . |
| 2095759 | 10/1982 | United Kingdom . |

OTHER PUBLICATIONS

Patent Abstracts of Japan, vol. 18, No. 115 (M–1566), Feb. 24, 1994, JP 53 09 726, Nov. 22, 1993.

*Design Engineering*, "The Efficient Use Of Compressed Air", Dec. 1977, p. 51 and following sides.

*Primary Examiner*—Catherine Timm
*Attorney, Agent, or Firm*—Harness, Dickey & Pierce, P.L.C.

[57] ABSTRACT

The procedure is designed for the pneumatic operation of a device in which at least one structural element is pneumatically actuated. The actuation is done by primary working air, which is fed to the pneumatic structural element from a primary working-air supply. In addition to the primary working-air supply at least one secondary working-air supply is used, which is provided with a lower pressure level than that of the primary working-air supply. After the execution of a working operation by a pneumatic structural element by means of a compressed-air supply from the primary working-air supply, during a transition phase a venting into the secondary working-air supply is carried out. After the transition phase a venting of the first pneumatic structural element vis-a-vis an ambient pressure is carried out. A second pneumatic working operation is powered by air from the secondary working-air supply.

8 Claims, 6 Drawing Sheets

MULTIPLE UTILIZATION OF WORKING AIR

The invention concerns a procedure for the pneumatic operation of a device, in which primary working air from a primary working-air supply is fed in for the pneumatic actuation of at least one structural element.

Moreover the invention also concerns a device for the execution of working operations by pneumatic actuation, in which at least one structural element is connected to a working-air supply for its pneumatic actuation.

Such a device can, for example, be designed to be a blowing machine for making containers, especially bottles. Such a container can be shaped, for example, according to a procedure in which first a preform made of polyethylene terephthalate (PET) is made in the injection-molding process, this preform is heated up after an intermediate storage, and subsequently it is fed to the blow station. However, it is also known how to make containers according to the spray-blow procedure, in which without the interposing of a heating step the preform is fed to the blow station immediately after being produced and after reaching an adequate stability. Finally, it is also known how to make preforms from tubular sections, which are sealed in the region of one of their ends and are provided with a suitable mouthpiece in the region of their other end.

What is common to all of these procedures is that the preform has substantially smaller contours than the container to be made. Therefore within the blowing station the preform is acted on by compressed air, in order to reshape it into the container that is to be made. In this inflation process, in addition to a reduction in wall thickness due to the expansion of the surface area the material of the object also becomes reoriented. This gives the thin walls of the container very great stability of shape, which makes the container suitable for a multitude of applications.

Various methods are known for carrying out the blowing process. For one thing, it is possible to employ a uniform blow pressure, which is introduced into the preform that is to be inflated, and after an adequate shaping this pressure is allowed to escape from the finished container against an ambient pressure. It is likewise already known how to first carry out a pre-widening of the preform at a relatively low pressure, in such a way as to already bring this relatively close to the shape of the container to be made, and only then to undertake the final impressing of the finer contours of the container by using a higher pressure. In this method as well, after the container is finished the blow air is vented against an ambient pressure.

Thus, in the case of heavy-duty blowing machines, whose production output often lies in the range of 2,000 bottles per hour to 20,000 bottles per hour and which customarily produce containers with volumes in the range of 0.5 to 3 liters, large amounts of compressed air are needed. So powerful compressors are required to provide this compressed air, which for one thing cost a great deal to purchase because of their high-power nature, and for another thing consume a considerable amount of energy because of the extensive air-compression required.

But basically the problem of the utilization of working air arises in connection with many different machines. In all the familiar pneumatic arrangements, a direct venting occurs against an ambient pressure after the execution of the designed working step. Thus the total volume of compressed air needed is the result of the sum of the volumes of all pneumatic driving elements and also of the actuation frequency per unit of time. Therefore especially in the case of large and complex pneumatic devices, corresponding heavy-duty and thus expensive compressors are needed, which because of their energy consumption give rise to correspondingly high energy costs.

Therefore the problem of the present invention is to improve on a procedure of the initially mentioned type in such a way that the consumption of working air is reduced.

This problem is solved in accordance with the invention by using in addition to the primary working-air supply also at least one secondary working-air supply, by providing the secondary working-air supply with a lower pressure level than that used by the primary working-air supply, by carrying out a venting into the secondary working-air supply during a transition phase following the execution of a working operation by a pneumatic structural element that uses a compressed-air supply from the primary working-air supply unit, by carrying out a venting of the pneumatic structural element vis-a-vis an ambient pressure after the transition phase, and by furnishing a second pneumatic working operation with air from the secondary working-air supply.

Another problem of the present invention is to design a device of the initially mentioned type in such a way that with a small expenditure on apparatus, a reduction in the consumption of working air can be achieved.

This problem is solved in accordance with the invention in such a way that in addition to the primary working-air supply at least one secondary working-air supply is provided, that the secondary working-air supply has a lower pressure level than the primary working-air supply does, that in the region of a connecting element that joins the pneumatic structural element to the primary working-air supply a switch-over mechanism is positioned that conducts working air from the region of the primary working-air supply into the region of a pneumatic structural element during a primary phase, and after the primary phase has ended this mechanism forms a connection, during a transition phase, between a driving element of the pneumatic structural element and the secondary working-air supply for the purpose of transferring working air, and that the pneumatic structural element is joined to a disengaging element, which after the transition phase has ended vents an interior space of the driving element vis-a-vis an ambient pressure, and that at least one other pneumatic functional element is connected to the secondary working-air supply.

By subdividing the pneumatic supply into systems with differing pressures, it is possible to always vent a higher pressure level into a lower pressure level after a working operation has been executed. In this way use is made of the fact that as a rule, for different working operations different pressures are needed in order to obtain the desired operational result. So, as a rule a higher pressure is needed to execute a forward feed motion when performing a working operation than is required for a return motion. Likewise certain motions are made, for example, against the force of gravity and other motions occur with support from gravitational forces. By this venting vis-a-vis the ambient pressure subsequent to the compressed-air transfer, it is ensured that during a return motion no residual pressure is there to generate counter-forces. Moreover, hazards caused by entrapped volumes of air are avoided. Depending on the fineness of the possible gradations and the degree of variability of the working operations to be carried out, it seems possible to achieve a reduction in volume of about 20% to 50% in the initial-volume flow. If no different requirements on the regulating forces are present, then adaptations can be made via the surface areas acted upon by the pressures.

One application of this procedure in a field of engineering where there is a relatively large potential for savings in terms of pneumatic elements may occur where a container made of a thermoplastic material is fabricated, whereby a preform is temperature-treated and then fed to a blow station that has a blow mold provided for contouring the container and into which the temperature-treated preform is placed, and whereby this preform is expanded by feeding in blow air, and at least a portion of the blow air is transferred into the region of the secondary working-air supply after the container has been shaped.

An application of the procedure for the execution of various positioning movements in the region of a structural element may occur where a stretching rod is used to stretch the container and this stretching rod is moved by furnishing air from the primary working-air supply for the purposes of stretching the preform, and the return stroke of the stretching rod is accomplished by providing air from the secondary working-air supply.

Another variant of the procedure applies to cases where positioning movements having a vertical component are executed, in which consideration is given in this variant to the force of gravity that acts upon the structure element in different movement directions when choosing the pressures needed for the positioning movements.

In order to bridge over process-dependent time intervals between a drawing off of compressed air and a re-use of this compressed air, and also in order to smooth out pressure fluctuations, it is proposed that compressed air flowing over from the region of the primary working-air supply into the region of the secondary working-air supply be stored in a reservoir at least temporarily.

Complex pneumatic structures can be avoided by an arrangement where in the region of a pneumatic structural element that is being fed from both the primary working-air supply and the secondary working-air supply for the execution of various different movements, a local compressed-air reservoir is used for transferred working air.

Using compressed-air reservoirs can be avoided, or alternatively the dimensions of compressed-air reservoirs already present can be reduced, in an arrangement where primary working air flowing from the pneumatic structural element is transferred into the region of another pneumatic structural element in such a way as to bring about a coupling of several structural elements that are essentially equivalent in construction, but are triggered in succession at different points in time.

A further reduction in pneumatic couplings can be made by providing in the region of the secondary working-air supply a feed-in mechanism for secondary working air that is independent of the transfer of primary working air flowing from the region of the pneumatic structural element.

In this way, for example, a working movement can me made first by using transferred primary working air. Subsequently separate secondary working air is fed in, which in certain applications can also have a pressure level similar to that of the primary working air.

In order to ensure the execution of pneumatic functions when localized malfunctions appear, it is proposed that the pneumatic structural element be operated in such a way that for the execution of a subsequent positioning movement, first of all compressed air transferred from the region of the primary working-air supply is used and then secondary working air flowing from an independent compressed-air source is used.

A typical application is implemented by an arrangement where at least one blow station designed to accommodate a temperature-treated preform is set up for the purposes of shaping a container made from a thermoplastic material, with this station being provided with a blow mold that has an inner contour matched to the container to be molded, and also being provided with a blow-air supply for purposes of expanding the preform.

In order to allow the switching processes to be controlled by mechanical means, it is proposed that the important pneumatic switch-over processes be executed by providing a plate cam equipped with air slots, in correspondence with which a rotatably seated follower plate with contact holes is guided.

An especially simple embodiment can be provided by an arrangement where at least two air slots of the plate cam are associated with different working movements to be executed, where one of the working movements is executable at a higher pressure relative to the execution of the other working movement, where these operational slots are subdivided by separating elements into segments that are partitioned from one another in a pressure-tight manner, and where at least one segment of one of the air slots is connected to at least one segment of a neighboring air slot for the transfer of compressed air.

The plate cam can be tight-sealed vis-a-vis the follower plate by means of surface pressure.

In order to decouple the switching functions that are to be executed, it is proposed that at least one switchable valve be provided for the execution of the switch-over processes.

In particular it is contemplated that at least one of the valves be designed as an electromagnetic valve.

BRIEF DESCRIPTION OF THE DRAWINGS

In the drawings, exemplifying embodiments of the invention are schematically represented.

DESCRIPTION OF THE PREFERRED EMBODIMENT

The device for the execution of working operations by pneumatic actuation can, for example, be designed as a machine for the blow molding of containers. The basic structure of such a device is sketched in FIG. 1.

Figure 1:
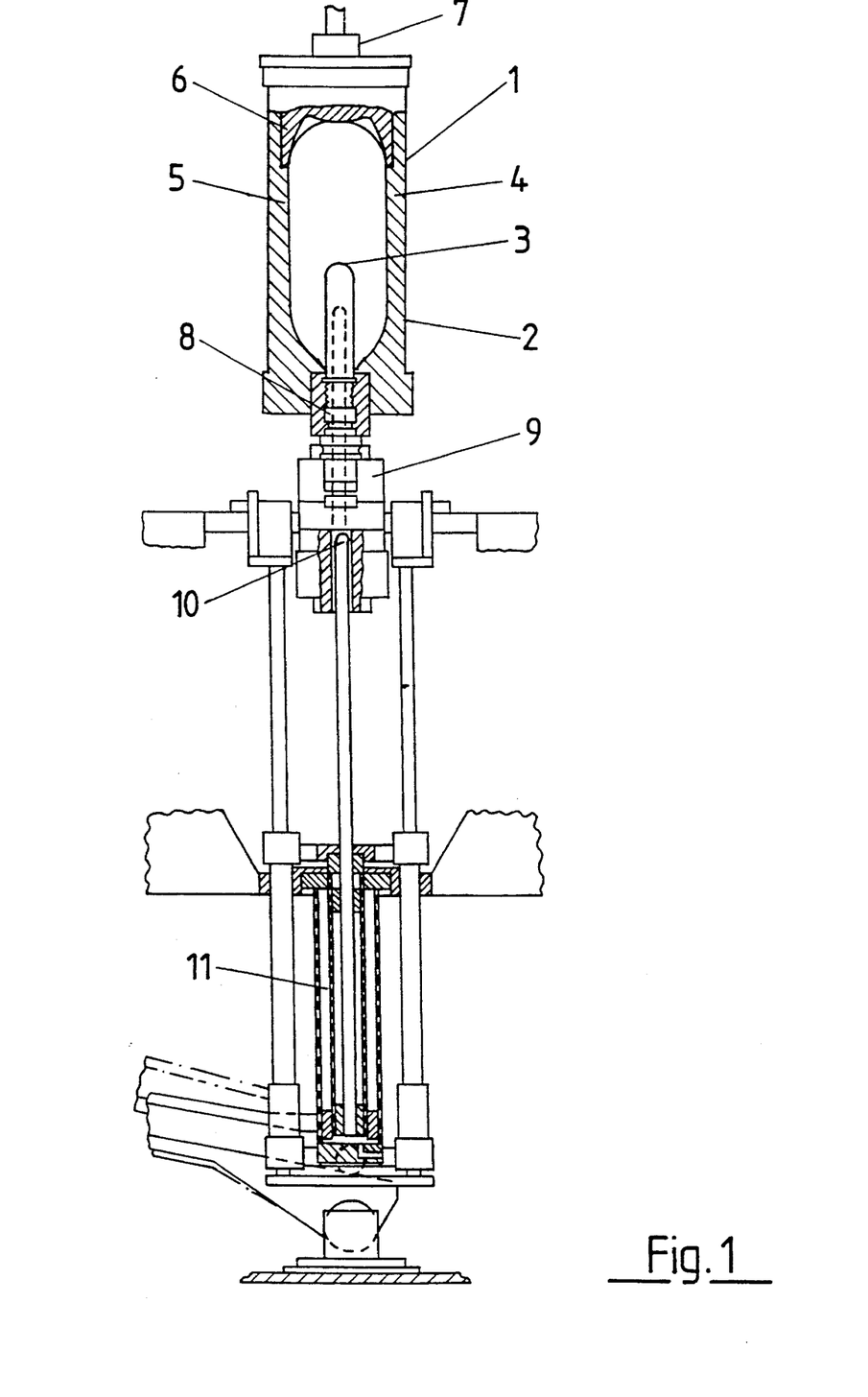
FIG. 1 shows a partially cut-away diagrammatic representation of a blow station with a stretching mechanism.

The device for molding a container consists essentially of a blow station (1), which is equipped with a mold (2) into which a preform (3) can be inserted. The preform (3) can be an injection-molded piece made of polyethylene terephthalate. In order to permit the insertion of the preform (3) into the mold (2) and in order to permit removal of the finished container, the mold (2) consists of mold halves (4,5) and a bottom piece (6), which can be positioned by a displacement device (7). The preform (3) can be held in the region of the blow station (1) by a transport mandrel (8), which together with the preform (3) passes through a number of treatment stations within the device. But it is also possible to insert the preform (3) directly into the mold (2), for example by using grippers or other handling means.

Delivery of compressed air is made possible by a connecting piston (9) that is positioned beneath the transport mandrel (8), which feeds compressed air to the preform (3) and simultaneously makes a seal with respect to the transport mandrel. But it is also essentially conceivable to have a modified design where fixed compressed-air delivery mechanisms are used.

The preform (3) is stretched by means of a stretching rod (10), which is positioned by a cylinder (11). But it is also basically conceivable to perform a mechanical positioning of the stretching rod (10) by way of cam segments that are acted on by sensing rollers. The use of cam segments is appropriate in particular when a number of blow stations (1) are arranged on a rotating blow wheel. It is appropriate to use cylinders (11) when stationary blow stations (1) are provided.

Figure 2:
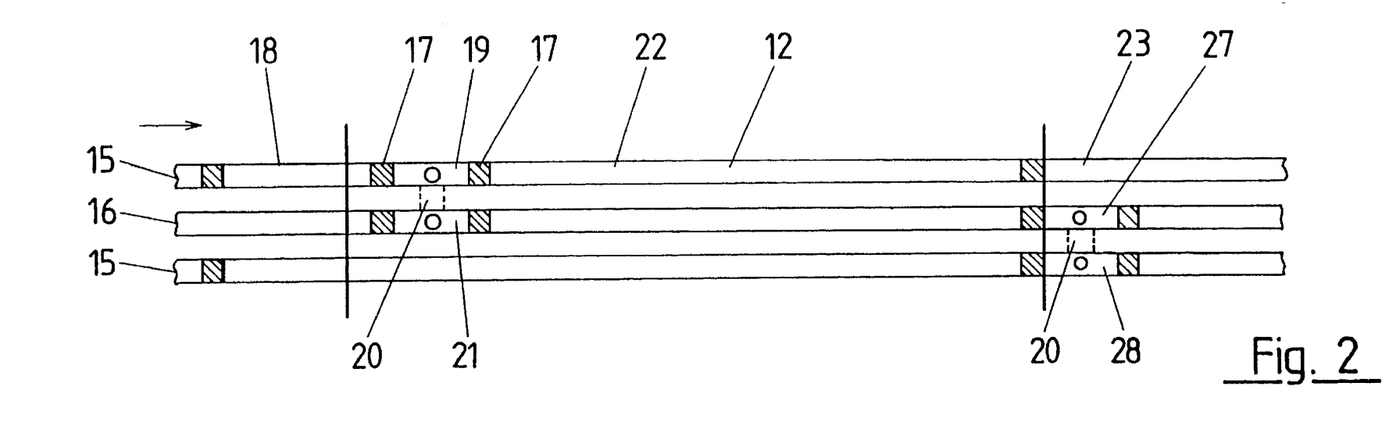
FIG. 2 is a diagrammatic representation of air slots in the region of a plate cam with a separate reservoir slot.

In order to illustrate the multiple utilization of working air, FIG. 2 gives a simplified representation of air slots (12) of a plate cam (13). The air slots (12) actually run radially around a central point (14) of the plate cam (13), in accordance with the representation in FIG. 4. But the basic sequence of steps can be seen more easily from the linear picture in FIG. 2 and FIG. 3.

The representation in FIG. 2 shows a design involving two working slots (15) and a reservoir slot (16). Similar pneumatic structural elements can be connected to each of the working slots (15). The air slots (12) are subdivided by separation elements (17) into regions that are sealed off from one another. In this way it is possible to arrange for pressure regions with differing pressure levels along the course of an air slot (12). For the working slot (15) shown at the top in FIG. 2, starting with the first separation element (17) in the left-hand region there is positioned first a primary segment (18), adjacent to which is a transfer segment (19). The transfer segment (19) is connected by a cross-hole (20) to a receiving segment (21) in the reservoir slot (16).

In the region of the working slot (15), a holding segment (22) is adjacent to the transfer segment (19), and this is followed in turn by a venting segment (23). In the region of the primary segment (18) a pressure of about 6 bars can be provided, for example, while in the region of the transfer segment (19) a pressure reduction to about 3 bars occurs through a transfer of air into the receiving segment (21). This pressure of 3 bars is maintained in the region of the holding segment (22). In the region of the venting segment (23) a reduction in pressure down to the ambient pressure takes place. The pressures are conveyed in each case via contact holes (24) in the region of a follower plate (25), which is positioned to be in correspondence with the plate cam (13). The follower plate (25) rotates relative to the stationary plate cam (13) in the direction of a particular rotary orientation (26).

The receiving segment (21) is connected to a pressure reservoir, from which the stored compressed air can be withdrawn again as needed. A transfer of the stored compressed air takes place, for example, in the region of a draw-off segment (27), which is positioned along with a discharge segment (28) in the region of the working slot (15) that has been drawn in at the bottom part of FIG. 2.

In an application involving the initially described device for the blow molding of containers, it is possible for example, to subdivide the device into several blow stations (1) and associate each blow station (1) with a separate air reservoir. In particular, such a reservoir can also be filled with different pressures that succeed one another. When there is a complete decoupling of the pneumatic functions it is possible, for example, to first of all use the pressure of the primary working-air supply (31) for the purpose of carrying out a stretching process. After an appropriate pressure transfer and venting, the stored pressure volume can then be used for the return travel of the stretching rod (10). In a subsequent production step, the temporarily stored compressed air can be used once more to execute a closing movement of the mold halves (4,5), and in a final pressure stage the mold halves (4,5) can be locked together.

In all the procedural variants, advantage can be taken of the fact that generally a lower pressure is required to maintain a certain positioning than to rapidly undertake the designed positioning. Therefore after the execution of the positioning move, the pressure can be lowered. In all the procedural steps it can be taken into consideration whether for certain movement directions different positioning forces are required, which result, for example, from material resistances arising in the material to be shaped or from the action of forces due to weight distributions.

Figure 3:
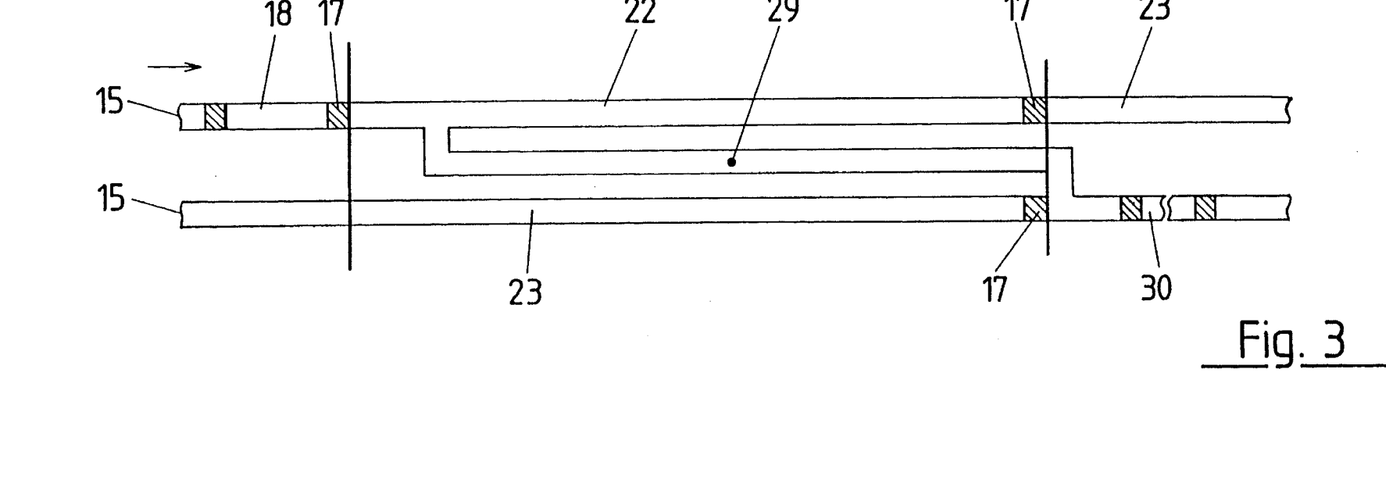
FIG. 3 is a diagrammatic representation of a plate cam with air slots and with a transfer slot between two neighboring air slots.

FIG. 3 shows a procedural variant in which a transfer of working air takes place directly between the working slots (15). Thus no separate air reservoir is provided in this case. The transfer occurs with the aid of a connecting segment (29).

Thus in the procedural variant in accordance with FIG. 2, no coupling of blow stations with one another is present, but rather it is only functions that are coupled together in the region of a single blow station. On the other hand, in the embodiment according to FIG. 3 a coupling of several blow stations with one another takes place. In order to avoid problems of functioning in starting the machine after a malfunction or in an initial operation, it is useful to position an auxiliary-air segment (30) in back of the connecting segment (29). The auxiliary-air segment (30) ensures that even when the transfer of compressed air is deficient, with the aid of the connecting element (29) the designed function can be carried out. Thereby, mechanical damage due to non-executed movement operations is avoided.

Figure 4:
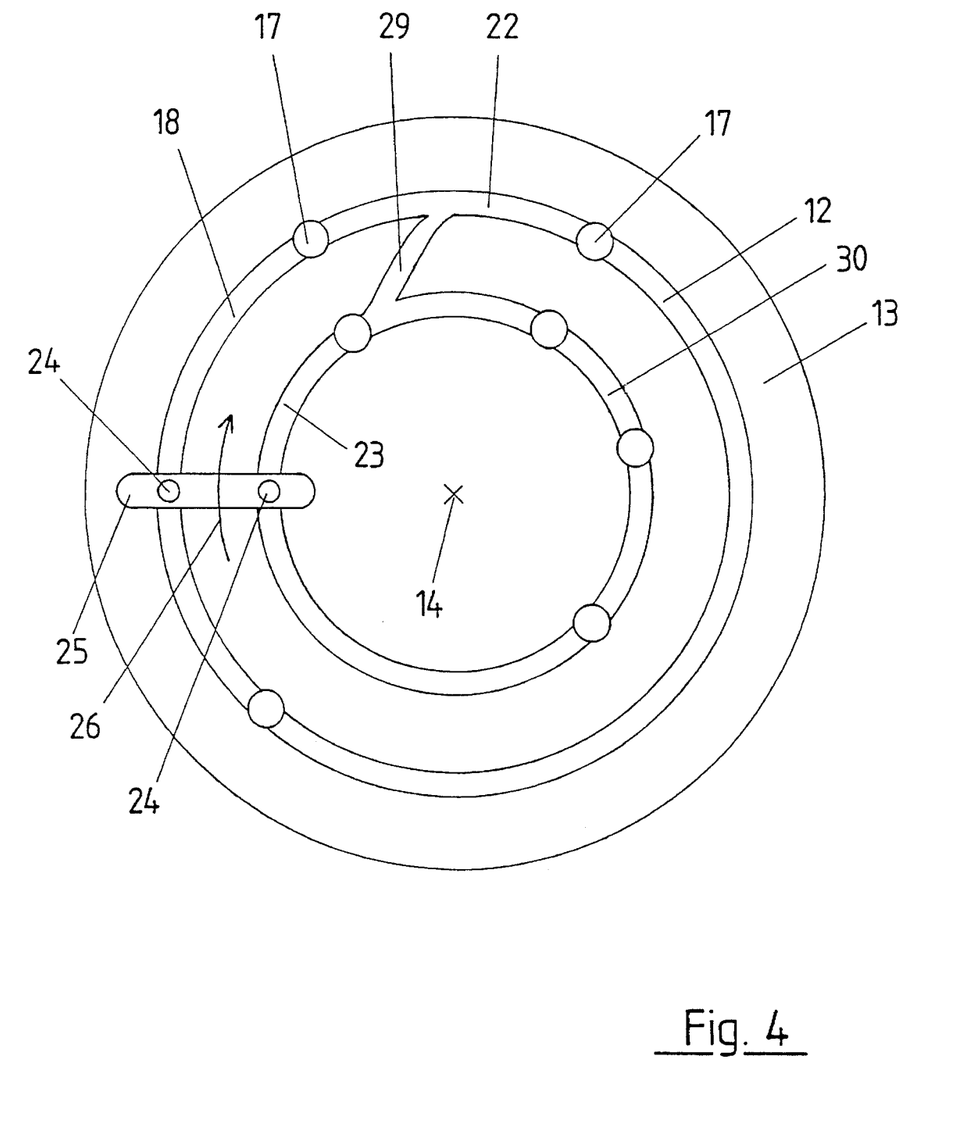
FIG. 4 is a diagrammatic representation of a plate cam with a corresponding follower plate.

FIG. 4 shows a simplified representation of the procedural variant according to FIG. 3. But here the specific actually present radial arrangement of the air slots (12) has been drawn in.

Figure 5:
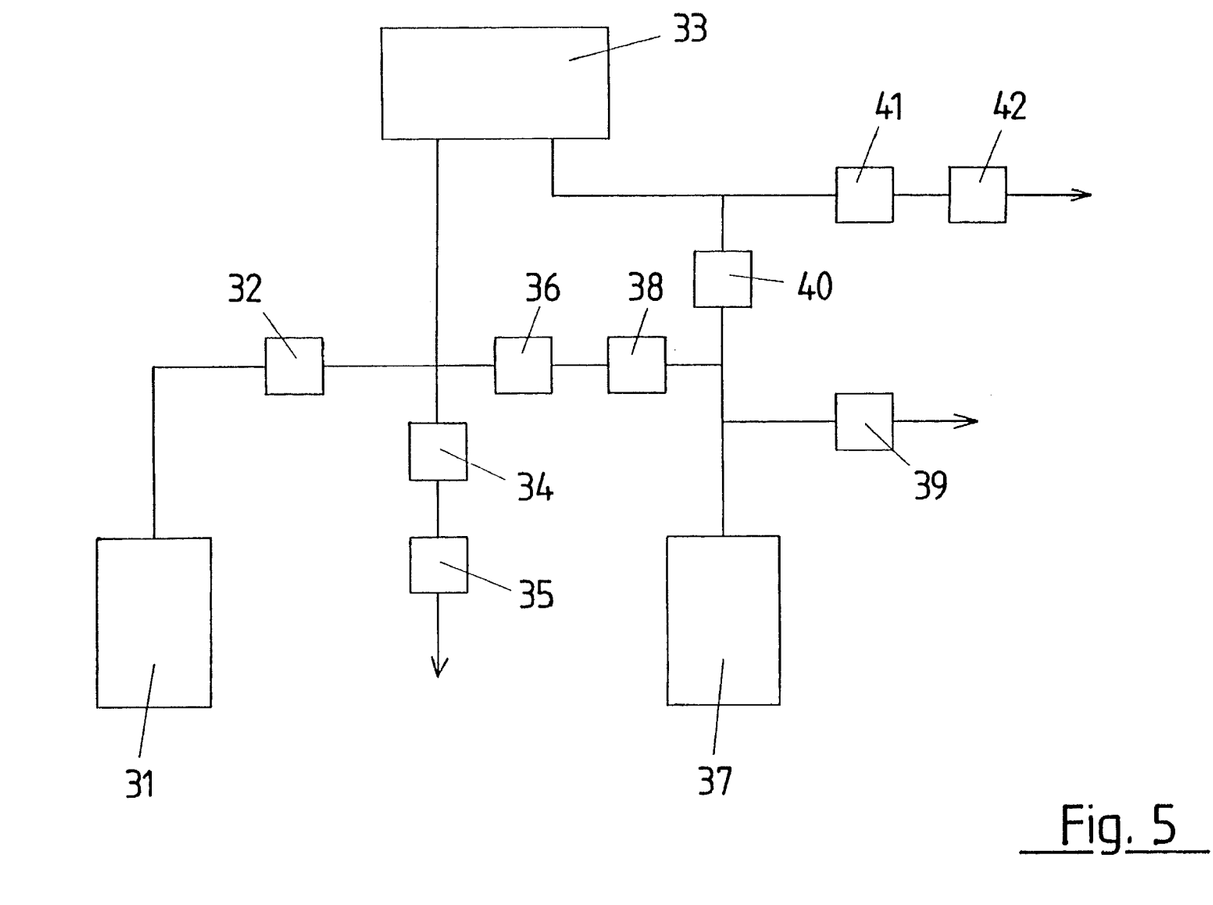
FIG. 5 is a schematic picture to illustrate a multiple utilization of working air in the region of a device designed to execute positioning movements in various different directions.

FIG. 5 shows a very schematized functional representation in connection with using controllable relay valves. In this variant, primary working air from a primary working-air supply (31) is directed via a primary valve (32) into the region of a pneumatic structural element (33). In order to execute total venting, a primary venting valve (34) and a primary sound absorber (35) are provided. After execution of the designed movement with the aid of the primary working air, via a transfer valve (36) there is a transfer of compressed air into the region of a secondary working-air supply (37). The compressed-air transfer can occur with the interposition of a pressure-relief device (38), which prevents the pressure from becoming too large in the region of the secondary working-air supply (37). Alternative to or in supplementation of the secondary working-air supply (37), a compressed-air reservoir that accommodates the transferred compressed air can be used.

In addition, a pressure-monitoring mechanism (39) is hooked up in the region of the secondary working-air supply (37). Secondary working air is fed in by means of a secondary air valve (40). For the execution of venting in the region of the secondary working air, a secondary venting valve (41) as well as a secondary sound absorber (42) are provided.

Thus, a function could be executed in the following way: first the primary valve (32) opens and compressed air is conducted into the region of the pneumatic structural element (33). After execution of the working operation the primary valve (32) closes and the transfer valve (36) opens. After the transfer valve (36) has again closed and upon termination of a possibly necessary backup period, the primary valve (34) opens and carries the compressed air away in the direction of the environment. In order to feed in secondary working air, the secondary-air valve (40) opens, and after the execution of the associated working operation and after the secondary air valve (40) has closed, finally the secondary venting valve (41) is opened.

Figure 6:
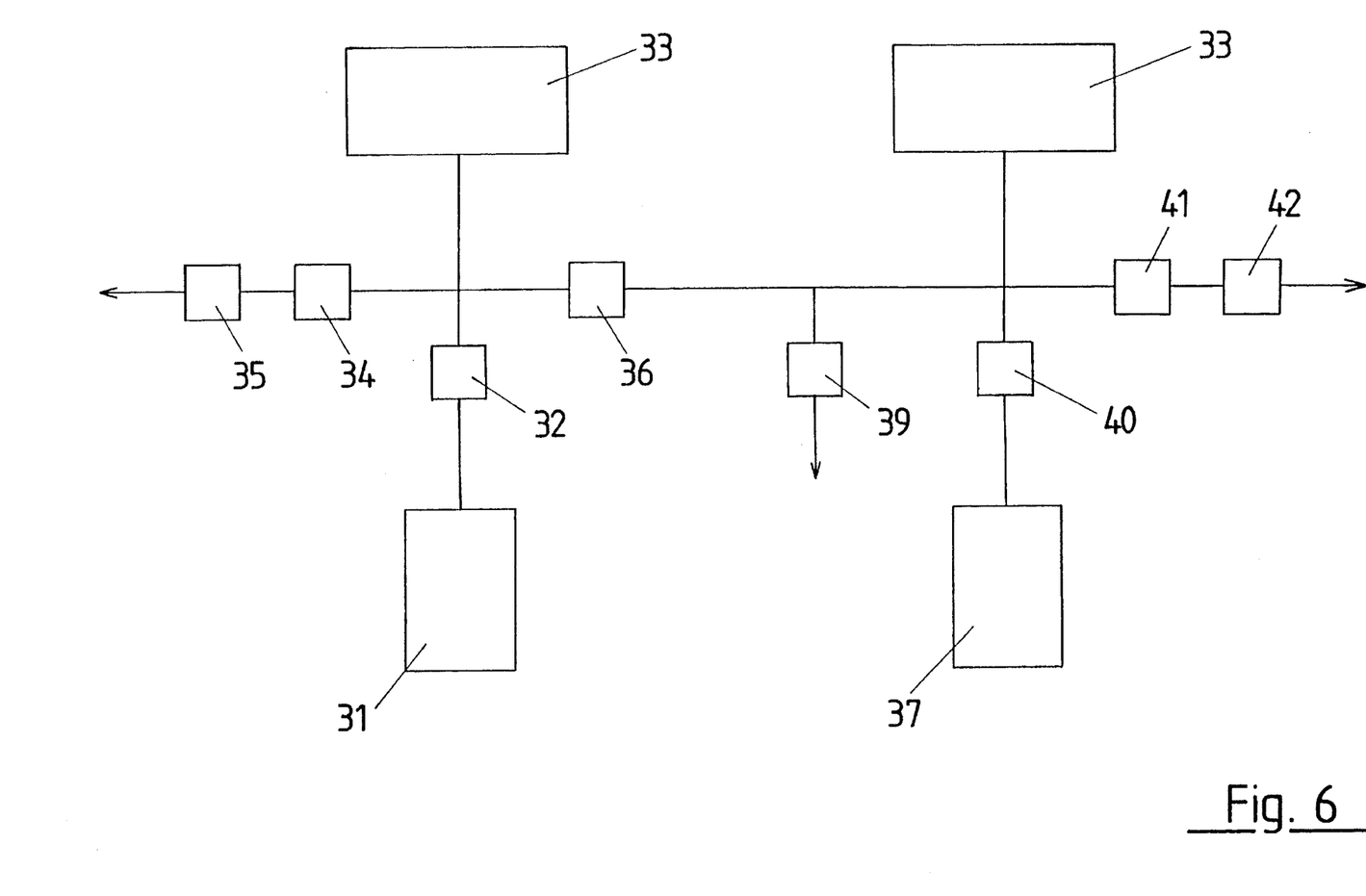
FIG. 6 is a schematic representation showing the multiple utilization of working air in the region of different devices.

FIG. 6 shows a variant in which two different pneumatic structural elements (33) are coupled together. The arrangement of the primary working-air supply (31), of the primary valve (32), of the primary venting valve (34), and of the primary sound absorber (35) is essentially the same as the embodiment according to FIG. 5. However, in the embodiment according to FIG. 6 the transfer valve (36) is used to transfer primary working air from the region of the pneumatic structural element (33), after the execution of an associated working step, into the region of another pneumatic structural element (33) for the execution of a working step at a lower pressure level.

In none of the embodiments does the lower pressure level necessarily have the consequence that a smaller force is also required for the subsequent working movement. As is known, in the field of pneumatics the force exerted is the result of the product of the pressure of the medium and the area being acted upon. Thus if a larger surface area is provided for the pneumatic piston in the region of the subsequent pneumatic structural element, then also the generation of a correspondingly larger force is possible. However, because of the amount of pressure volume available, the stroke that is to be performed in the region of the subsequent pneumatic element is limited by the transfer valve (36) if there is only a single compressed-air supply. Therefore the possible stroke range can be enlarged by using a separate additional secondary working-air supply (37), which not only performs a storage function for compressed air from the region of the transfer valve (36), but is also able to independently feed in secondary working air.

Here, the connecting of the transfer valve (36) to the second pneumatic structural element (33) happens at a point behind the secondary air valve (40), when viewed from the direction of the secondary working-air supply (37). This produces an additional decoupling vis-a-vis the secondary working-air supply (37). But the switching variant according to FIG. 5 can essentially be used in this embodiment as well.

Figure 7:
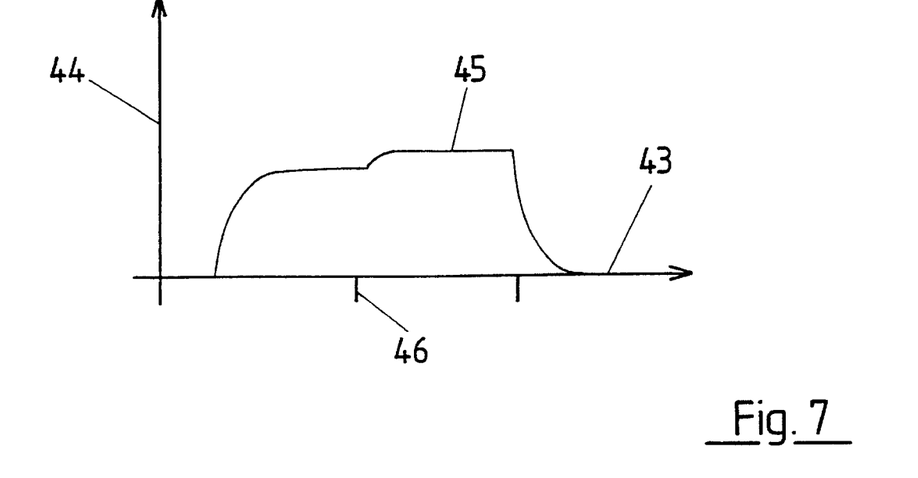
FIG. 7 is a sketch of the course of pressure changes in the region of a follow-on station with a transfer phase and a subsequent feed-in of separate compressed air at a designed pressure level and FIG. 8 shows a modified pressure pattern in the region of a station that precedes the above follow-on station.

In FIG. 7 a pressure-time diagram is drawn in to illustrate one possible pattern of pressure changes in the region of the second structural element (33). A time axis (43) and a pressure axis (44) are provided. In a coordinate system represented by the time axis (43) and the pressure axis (44), a pressure curve (45) is shown that depicts the pressure variation in the region of the subsequent pneumatic structural element (33) due to the transfer of primary working air up to a switch-over point (46), and after this switch-over point (46) the pressure variation due to an interconnecting of the secondary working-air supply (37). The pressure change plotted within the region of the switch-over point (46) was arbitrarily assumed to be an increase here, but whether a change in pressure occurs at this point in time and how large this may be depends on the volume of the primary working air that can be transferred and on how the pressure-monitoring mechanism (39) functions.

Figure 8:
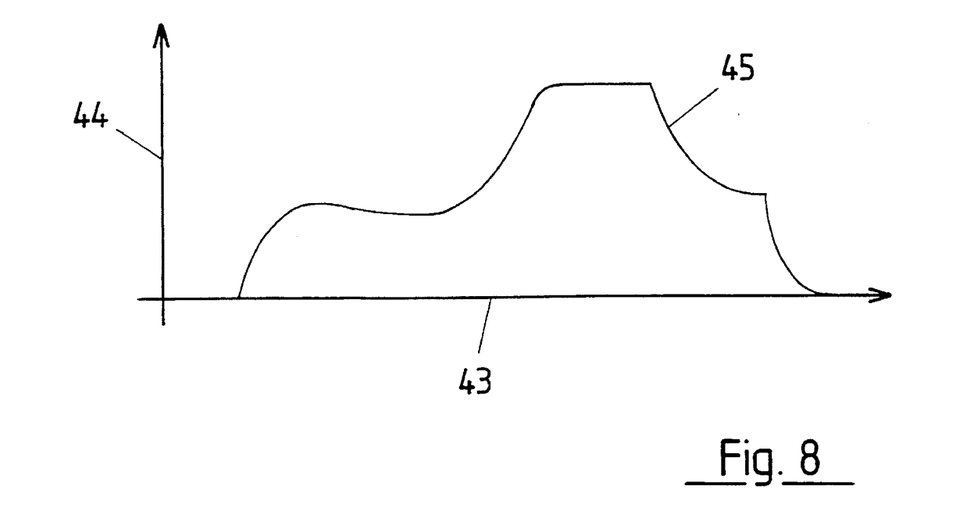

FIG. 8 shows the corresponding pressure curve for the preceding pneumatic structural element (33), with a dilation of the time axis (43). The pressure curve initially increases, and during the execution of the stroke movement at first remains at roughly the same level, due to flow effects. After the final level has been reached and maintained, an initial pressure reduction takes place due to compressed-air transfer, and subsequently another pressure reduction occurs due to venting against the environment.

I claim:

1. In a blow molding apparatus in which a container of a thermoplastic material is fabricated, a procedure for the multiple utilization of working air to effect actuation of pneumatic structural elements, said procedure comprising:

feeding a temperature treated preform into a blow molding station, having a blow mold for contouring the container;

stretching said preform within said blow molding station by supplying pressurized fluid to a cylinder for moving a stretching rod, said cylinder being supplied with pressurized fluid from a secondary pressurized fluid supply at a pressure less than a predetermined pressure to effect a portion of the movement of said stretching rod;

expanding the preform within the blow mold by supplying pressurized fluid from a primary working fluid supply, said pressurized fluid being supplied at said predetermined pressure;

venting said pressurized fluid from said preform to said secondary pressurized fluid supply during a transition phase;

venting said pressurized fluid in said preform to atmosphere subsequent to venting to said secondary pressurized fluid supply; and said cylinder being supplied with pressurized fluid from said secondary pressurized fluid supply subsequent to venting of said pressurized fluid from said preform to said secondary pressurized fluid supply.

2. A procedure as set forth in claim 1 wherein said cylinder is supplied with pressurized fluid from said primary working fluid supply to effect movement in a first direction to stretch said preform and said cylinder is supplied with pressurized fluid from said secondary working fluid supply to effect a return stroke of said stretching rod.

3. A procedure as set forth in claim 2, characterized in that during the execution of positioning movements having a vertical component, the gravitational force acting on the structural element in various different movement directions is taken into account in the selection of the pressures needed for the positioning movements.

4. A procedure as set forth in claim 1, characterized in that pressurized fluid flowing to the secondary working fluid supply is at least temporarily stored.

5. A procedure as set forth in claim 1 wherein said blow molding apparatus includes additional structural elements movable in response to a supply of pressurized fluid from said secondary working fluid supply and said secondary working fluid supply includes one or more local reservoirs positioned adjacent said structural elements, said procedure including supplying pressurized fluid from said local reservoirs for effecting at least a portion of the movement of said structural elements.

6. A procedure as set forth in claim 1, characterized in that said pressurized fluid supplied to said cylinder from said secondary working fluid supply is subsequently supplied for actuation of other structural elements in succession.

7. A procedure as set forth in claim 1, further comprising supplying said secondary working fluid supply with an additional supply of secondary working fluid independent of the transfer of primary working fluid.

8. A procedure as set forth in claim 1, wherein said cylinder is first supplied with the pressurized fluid from said primary working fluid supply for the execution of a subsequent positioning movement, and subsequently said cylinder is supplied with pressurized fluid from a supply of working fluid flowing from an independent compressed fluid source.

* * * * *